(12) United States Patent
Casella et al.

(10) Patent No.: US 9,308,663 B2
(45) Date of Patent: *Apr. 12, 2016

(54) METHOD FOR CUTTING BLADE CONTROL SYSTEM, PARTICULARLY FOR CUTTING-OFF MACHINES FOR CUTTING LOGS OF WEB MATERIAL

(75) Inventors: Sergio Casella, Lucca (IT); Mauro Biagioni, S. Pietro a Vico—Lucca (IT)

(73) Assignee: Paper Converting Machine Company Italia SPA, Lucca (IT)

( * ) Notice: Subject to any disclaimer, the term of this patent is extended or adjusted under 35 U.S.C. 154(b) by 628 days.

This patent is subject to a terminal disclaimer.

(21) Appl. No.: 13/359,257

(22) Filed: Jan. 26, 2012

(65) Prior Publication Data

US 2012/0118118 A1 May 17, 2012

Related U.S. Application Data

(62) Division of application No. 11/143,527, filed on Jun. 2, 2005, now Pat. No. 8,136,434.

(30) Foreign Application Priority Data

Jun. 24, 2004 (IT) ............................... MI2004A1269

(51) Int. Cl.
*B26D 7/24* (2006.01)
*B27B 5/18* (2006.01)
(Continued)

(52) U.S. Cl.
CPC ................ *B26D 7/24* (2013.01); *B23D 59/001* (2013.01); *B23D 59/002* (2013.01); *B23Q 15/12* (2013.01);
(Continued)

(58) Field of Classification Search
CPC .............. B26D 3/16; B26D 7/10; B26D 7/24; B23D 59/001; B23D 59/002; B23Q 15/12; B27B 5/18; B27B 5/185; B27B 5/187; B27B 5/188; G05B 2219/37386; G05B 2219/45144; G05B 2219/49106; Y10T 83/089; Y10T 83/303; Y10T 83/313; Y10T 83/7145; Y10T 83/778; Y10T 83/7793
USPC ............. 83/62, 62.1, 72, 74, 171, 174, 174.1, 83/487–491, 794, 796–798, 801, 483
IPC ....................................... B26D 3/16, 7/10, 7/24
See application file for complete search history.

(56) References Cited

U.S. PATENT DOCUMENTS 3,380,495 A * 4/1968 Weston, Jr. ............. B27B 29/10
 192/142 R
3,589,482 A * 6/1971 Weston, Jr. ........... B60T 8/1705
 192/142 R (Continued)

FOREIGN PATENT DOCUMENTS

EP 1075910 A1 2/2001
FR 2904816 A1 2/2008

(Continued)

*Primary Examiner* — Clark F Dexter
(74) *Attorney, Agent, or Firm* — Greer, Burns & Crain, Ltd.

(57) ABSTRACT

A control method for a cutting blade, particularly for cutting-off machines for logs of web material, interrupts operation of the cutting blade when deformation of the blade reaches a preset deformation value and resumes operation of the cutting blade when the deformation of the blade is less than another preset deformation value. The control method measures deformation values of at least a portion of the cutting blade, compares the measured deformation values with at least one preset deformation value set by an operator, and sends, according to signals coming from the result of the comparison, control signals to a motor of the machine to control the start up and/or the stop of the motor.

5 Claims, 3 Drawing Sheets

(51) Int. Cl.
  *B23Q 15/12* (2006.01)
  *B23D 59/00* (2006.01)
  *B26D 3/16* (2006.01)
  *B26D 7/10* (2006.01)

(52) U.S. Cl.
  CPC ... *B27B 5/18* (2013.01); *B26D 3/16* (2013.01); *B26D 7/10* (2013.01); *G05B 2219/37386* (2013.01); *G05B 2219/45144* (2013.01); *G05B 2219/49106* (2013.01); *Y10T 83/04* (2015.04); *Y10T 83/089* (2015.04); *Y10T 83/303* (2015.04); *Y10T 83/313* (2015.04); *Y10T 83/7145* (2015.04); *Y10T 83/778* (2015.04); *Y10T 83/7793* (2015.04)

(56) References Cited

U.S. PATENT DOCUMENTS

| | | | |
|---|---|---|---|
| 3,885,487 A * | 5/1975 | Weston, Jr. | B23Q 15/00 477/185 |
| 4,148,236 A | 4/1979 | Holoyen et al. | |
| 4,498,345 A | 2/1985 | Dryer et al. | |
| 4,502,459 A | 3/1985 | Dyer | |
| 4,567,798 A | 2/1986 | Brdicko | |
| 4,584,917 A | 4/1986 | Blom | |
| 4,971,021 A | 11/1990 | Kubotera et al. | |
| 5,632,666 A | 5/1997 | Peratello et al. | |
| 5,694,821 A | 12/1997 | Smith | |
| 6,142,046 A | 11/2000 | Mierau et al. | |
| 6,378,408 B2 | 4/2002 | Smith | |
| 6,382,062 B1 | 5/2002 | Smith | |
| 6,576,531 B2 | 6/2003 | Peng et al. | |
| 6,701,816 B2 | 3/2004 | Smith | |
| 6,939,199 B2 | 9/2005 | Peng et al. | |
| 7,018,270 B2 | 3/2006 | Peng et al. | |
| 7,228,855 B2 | 6/2007 | Yamasaki et al. | |
| 2002/0020266 A1 * | 2/2002 | Smith | B23D 59/002 83/75 |
| 2002/0059856 A1 | 5/2002 | Smith | |
| 2003/0060022 A1 | 3/2003 | Peng et al. | |
| 2005/0109176 A1 * | 5/2005 | Wilson | B23D 47/08 83/13 |

FOREIGN PATENT DOCUMENTS

| | | |
|---|---|---|
| IT | 01318030 B | 6/2000 |
| JP | S5155404 A | 5/1976 |
| JP | 610476644 | 3/1986 |
| JP | S6443050 U | 3/1989 |
| JP | H06327584 A | 11/1994 |
| JP | 2001225998 A | 8/2001 |
| JP | 2006131344 A | 5/2006 |
| WO | 0061480 A1 | 10/2000 |
| WO | 2009004659 A1 | 1/2009 |
| WO | 2010114452 A1 | 10/2010 |

* cited by examiner

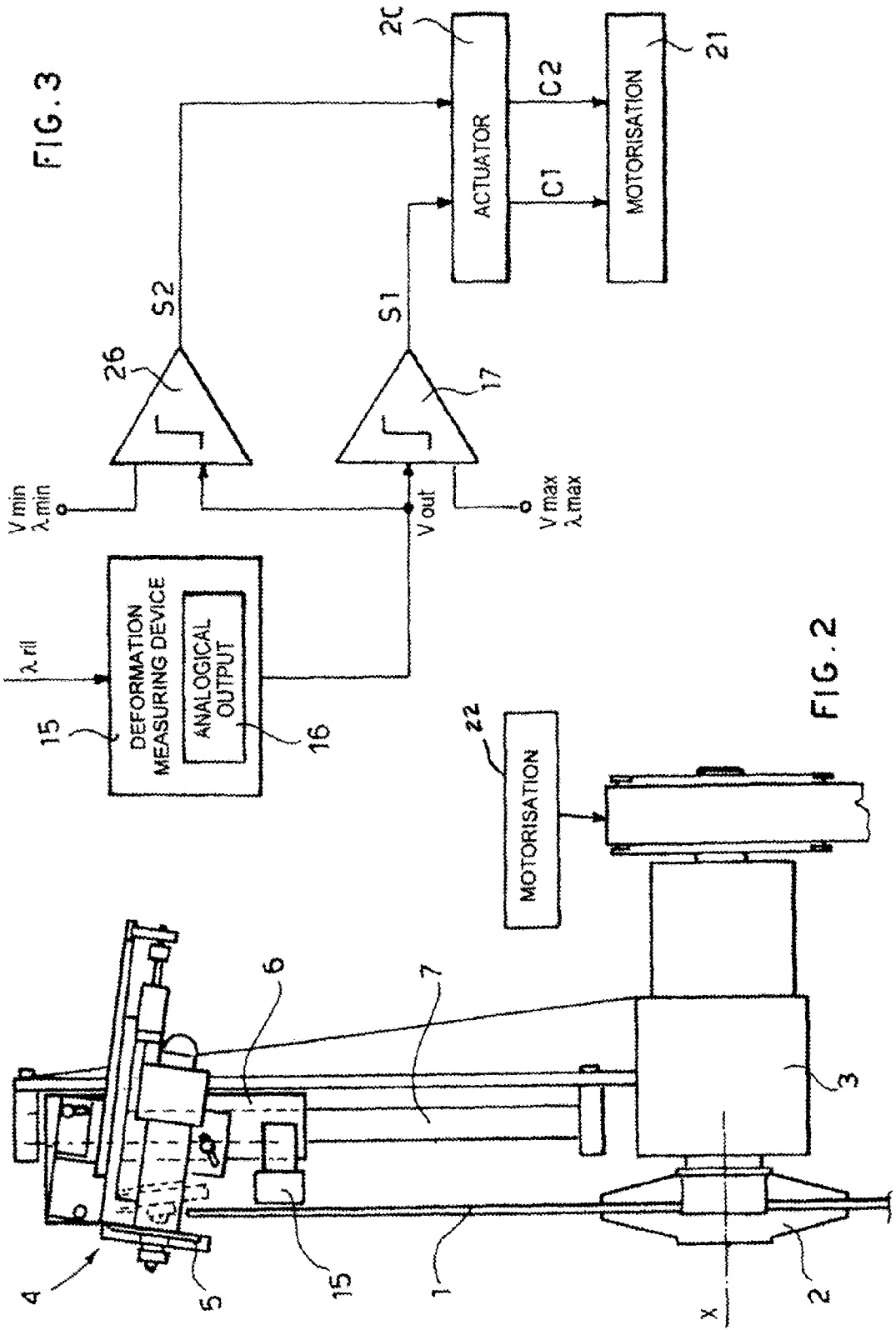

METHOD FOR CUTTING BLADE CONTROL SYSTEM, PARTICULARLY FOR CUTTING-OFF MACHINES FOR CUTTING LOGS OF WEB MATERIAL

RELATED APPLICATION

This application is a division of our co-pending application entitled CUTTING BLADE CONTROL SYSTEM, PARTICULARLY FOR CUTTING-OFF MACHINES FOR CUTTING LOGS OF WEB MATERIAL, Ser. No. 11/143,527, filed Jun. 2, 2005, now U.S. Pat. No. 8,136,434.

CLAIM TO PRIORITY

Applicants claim the priority of Italian Patent Application No. MI 2004 A 001269, filed Jun. 24, 2004. A certified copy of the priority document was filed in the parent application, Ser. No. 11/143,527.

BACKGROUND

The present invention refers to a cutting blade control system, particularly for cutting-off machines for cutting logs of web material.

In the production of rolls of web material, such as paper, tissue paper, non-woven fabric, plastic materials etc., logs or batons are initially produced and must subsequently be cut into rolls of the desired length. For this purpose use is made of special cutting-off machines, sometimes called log saws, which have one or more cutting discs or rotating band saws that are cyclically lowered onto the logs to be cut. The cutting blade is moved towards the logs to be cut, which are conveyed on a conveyor driven by a chain extending around idler wheels.

In disc or band saw cutting-off machines a problem that reduces the production rates, even drastically, is the overheating and the consequent deformation of the cutting blade. Since the cutting blade, to perform the cutting of the log, must have a high speed of rotation during cutting, high friction is generated between the surface of the blade and that of the log to be cut, which causes an excessive overheating of the blade. Once a threshold temperature has been reached, which varies according to the material and to the shape of the cutting disc, a slackening and a thermal dilation of the disc take place, leading to deformation thereof. This deformation is due to the residual tensions induced in the cutting disc during manufacture to cause its surface to take on the desired planarity.

Consequently, once a threshold deformation of the blade has been reached, the cutting of the log must be interrupted to allow the cooling thereof, otherwise the excessively hot blade could be further deformed, becoming damaged or even breaking. Machine idle times to allow the blade to cool are calculated, entirely empirically, on the basis of the operator's professional skill. Consequently, to avoid damages to the blade, there is a tendency to stop the machine within wide safety limits, with the result of a drastic lowering of production.

Cutting-off machines according to the prior art can be programmed, for example, to make a certain number of consecutive cuts and then to stop for a predetermined time to allow the blade to cool. As previously stated, the number of consecutive cuts and the idle time are determined empirically by the operator, according to the type of product to be cut. Furthermore, even operating with the same product, logs of different densities due to irregularities in the grammage of the paper may be cut. Consequently, it is not easy to foresee the moment of the excessive overheating of the blade, which depends upon the density of the web material making up the log.

To overcome these drawbacks, at least in part, the applicants, as described in Italian patent No. 1.318.030, have provided for continuous control of the temperature of the cutting blade by means of temperature sensors.

However, temperature is not a parameter easy to measure with sensors, since the steel disc of the blade is dirty with lubricant, there are often coatings, for example of Teflon, on its surface and the shiny moving surface of the blade does not accurately reflect the signals emitted by some types of temperature sensors. Furthermore, the threshold temperature beyond which no correct operation of the blade is guaranteed varies according to the type of material used to form the blades and to the quality of said blades and thus is difficult to calculate precisely.

SUMMARY OF THE INVENTION

An object of the invention is to eliminate the drawbacks of the prior art by providing a control device for the cutting blade of a cutting-off machine for logs of web material that is reliable, practical, inexpensive and simple to make.

Another object of the present invention is to provide a method of controlling the cutting blade of a cutting-off machine for logs of web material that makes it possible to detect the condition of the cutting blade continuously, so as to stop the machine when the conditions of the cutting blade become inoperative.

The disc blade control system for a cutting-off machine, according to the invention, provides for continuous measurement of the deformation of the cutting blade by means of deformation measuring means. A maximum threshold deformation value—above which the blade could suffer damage—and a minimum threshold deformation value—at which operation of the disc without any risk of damage is advised—are set.

During the work cycle, the deformation of the blade measured by the deformation measuring means is compared with the maximum threshold deformation value. When the deformation measured exceeds the maximum threshold deformation value, a control signal is sent which orders the stop of the movement of the blade towards the log, thus stopping the work cycle of the machine and leaving active the motorization that transmits the rotary movement to the blade. In this manner, the blade is allowed to cool when it remains inactive during the stopping period of the machine and then to return to the initial conditions in which its deformation remains at a value below the threshold deformation value.

During this resting period, the deformation of the blade during rotation measured by the deformation measuring means is compared with the set minimum threshold deformation value. When the deformation measured falls below the minimum threshold deformation value, a control signal is sent which orders restarting of the general motorization of the machine and thus the work cycle of the machine starts again.

This deformation control system can be combined with a cooling system which consists in blowing ventilated and/or compressed and/or cooled and/or lubricated air onto the cutting blade to reduce the cooling times thereof and to bring the blade back to initial deformation values and consequently to reduce the idle times of the machine.

The advantages of the system according to the invention are evident. In fact with this system for controlling the deformation of the blade, machine idle times necessary for cooling the blade can be minimized. The machine idle times are calculated automatically by the system according to the invention, without any need to rely on the operator's skill.

DESCRIPTION OF THE DRAWING

Further characteristics of the invention will be made clearer by the detailed description that follows, referring to a purely exemplary and therefore non-limiting embodiment thereof, illustrated in the appended drawings, in which:

FIG. 2 is a view taken from the direction of the arrow B in FIG. 1;

FIG. 3 is a block diagram diagrammatically illustrating the operation of the blade control system according to the invention;

DESCRIPTION OF SPECIFIC EMBODIMENTS

With the aid of the drawings an embodiment of the blade control system according to the invention, applied to the cutting blade of a cutting-off machine for cutting logs of web material, will be described. Specific reference will be made herein to a disc blade, it being understood that the blade control system can also be applied to a band saw for cutting-off machines for logs of web material.

Figure 1:
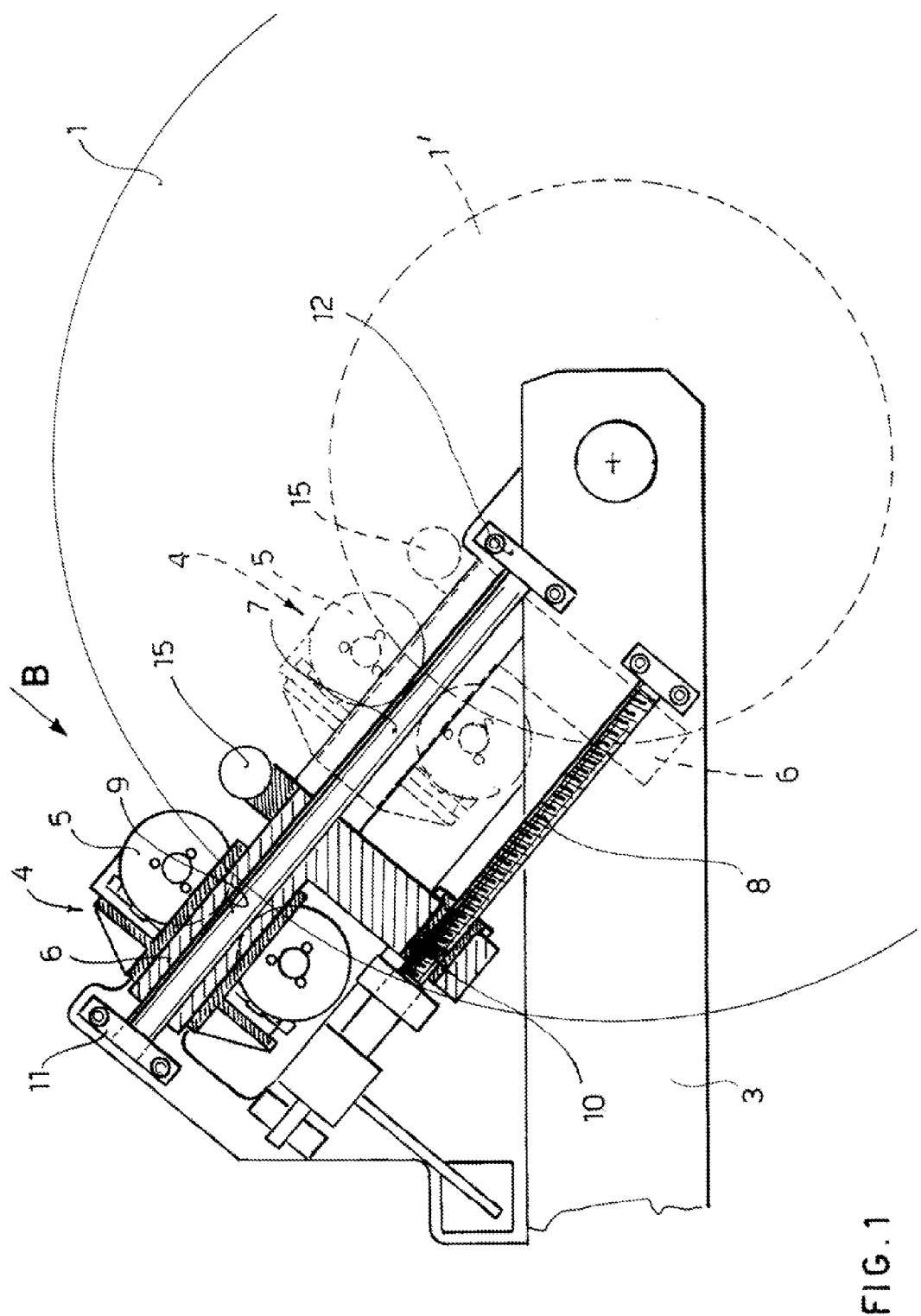
FIG. 1 is a partially sectional side view, showing the blade control device according to the invention, mounted on a disc blade of a cutting-off machine.

With reference to FIGS. 1 and 2, a disc shaped cutting blade 1 is shown. The blade 1 is mounted on a support 2 (FIG. 2) formed by two disc shaped shell halves disposed on the same axis X as the blade 1. The support 2 is mounted rotatably on a blade-carrying arm 3 to allow the blade 1 to rotate around its own axis X.

The blade-carrying arm 3 makes a substantially elliptical or circular movement, according to the type of machine, to bring the blade 1 toward or away from the cutting area into which the logs are fed, so as to be able to cut the logs into rolls of the desired length.

A grinding wheel assembly 4 is mounted on the blade-carrying arm 3 for sharpening of the blade 1. The grinding wheel assembly 4 has substantially disc shaped sharpening grinding wheels 5, disposed slightly inclined so as to touch the cutting edge of the blade 1.

The grinding wheels 5 are supported on a mobile support 6, substantially L-shaped in section (FIG. 1). Mounted on the blade-carrying arm 3 are a guide 7 in the form of a rod disposed radially with respect to the disc 1 and a threaded screw 8 disposed parallel with respect to the guide 7. The guide 7 and the screw 8 engage respectively in a hole 9 and in a threaded hole 10 formed in the mobile support 6. In this manner, by rotating the screw 8, the mobile support 6 can slide along the guide 7. The guide 7 has stops 11 and 12 disposed at its ends to prevent the mobile support 6 from coming out.

Measurement means (not shown), per se known in the art, are provided to measure the wear on the blade 1, that is to say the decrease in the radius of the blade 1. On the basis of said measured value of the radius of the blade 1, a control signal is sent to a drive for the screw 8, which turns the screw 8 to move the mobile support 6, so that the grinding wheels 5 are always on the cutting edge of the blade 1. Thus the movement of the grinding wheel assembly 4 follows the decrease in radius of the blade 1.

In FIG. 1, by way of example, a situation has been shown in which the disc 1 has a maximum radius, the mobile support 6 is at the top end-of-stroke point and the grinding wheels 5 are on the cutting edge of the blade 1.

Furthermore, in FIG. 1 a situation is shown in which the cutting blade 1 is worn to the point of having a cutting blade 1' (shown with a thin dotted line) with a diameter about half the diameter of the blade 1. In this situation the mobile support 6 of the grinding wheel assembly 4 (shown with a thin dotted line) is at the bottom end-of-stroke point and the grinding wheels 5 are still on the cutting edge of the blade 1'.

According to the invention, a deformation measuring device 15 is mounted on the mobile support 6, in a position slightly beneath the grinding wheels 5. In this manner the deformation measuring device 15 is pointed at a peripheral area of the cutting blade 1, slightly on the inside of the cutting edge which is situated in the direction of the grinding wheels 5. The deformation measuring device 15, being mounted on the mobile support 6, always detects deformation in the same peripheral area of the blade 1 relative to its cutting edge. In fact, as previously described, the mobile support 6 follows the decrease in diameter of the blade 1 due to wear thereof.

The deformation measuring device 15 can, for example, be a device able to measure a deformation of the planarity of the blade surface, that is to say the lateral deformation (twisting) of the blade 1. For this purpose, the deformation measuring device 15 can, for example, be a distance sensor 15, able to measure the distance between it and the lateral surface of the blade 1 in order to have an indication of the variations in the planarity of the blade.

The distance sensor 15 must preferably have a resolution in the order of microns and be able to perform reading samplings in the order of milliseconds. For this purpose a laser probe provided with a laser transmitter/emitter coupled to an optical receiver/detector can be used.

Figure 4:
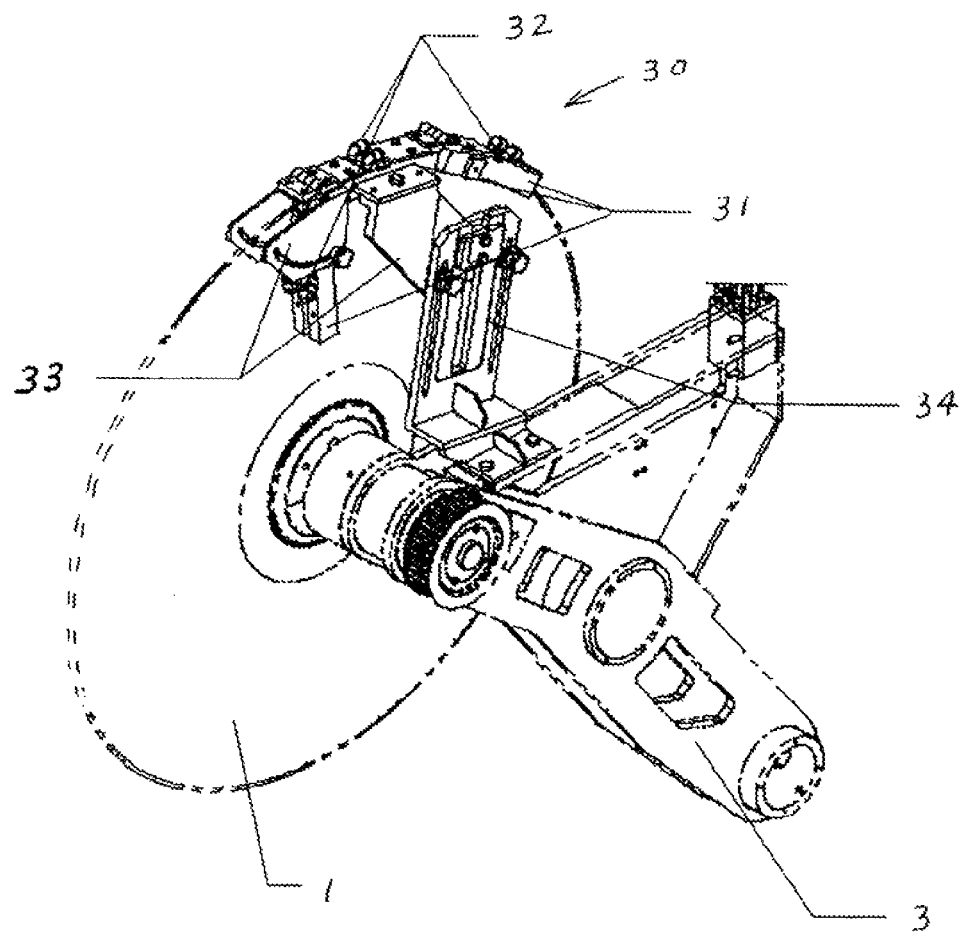
FIG. 4 illustrates a cooling device for the blade.

Furthermore the deformation control device of the blade 1 can be combined with a blade cooling device 30 (FIG. 4). This blade cooling device 30 provides an airing system, which blows jets of ventilated and/or compressed and/or cooled and/or lubricated air onto the blade 1 to decrease its temperature.

As shown in FIG. 3, the deformation measuring device 15 measures the deformation $\lambda_{ril}$ of the cutting blade 1. The deformation measuring device 15 comprises an analogical output 16, which emits an electrical voltage value $V_{OUT}$ (generally comprised between 0-10V) indicating the measured deformation $\lambda_{ril}$. The deformation value can be acquired on each reading or can be worked out by calculating a mean value of a reading sampling (quadratic mean, maximum deviation, arithmetic mean of deviations, and the like).

The voltage value $V_{OUT}$ is sent to a first comparator 17, which compares it with a threshold voltage value $V_{max}$ indicative of a maximum threshold deformation value $\lambda_{max}$, above which the blade 1 could suffer damages during the cutting process. If $V_{OUT}$ is greater than $V_{max}$, the comparator 17 gives out a signal S1 that is sent to an actuator 20 of the general motorization 21 of the machine. When the signal S1 is received, the actuator 20 gives out a control signal C1, which stops the motorization 21, and thus the machine cycle. As is well known in the art, the motorization 21 controls the movement of the blade toward the log. A separate motorization 22 can continue to rotate the blade about its axis X.

Again the voltage signal $V_{OUT}$, indicative of the measured deformation $\lambda_{ril}$, is sent to a second comparator 26, in which it is compared with a minimum threshold voltage value $V_{min}$, indicative of a minimum threshold deformation value $\lambda_{min}$, at which the cutting-off machine can safely operate without the risk of causing damages to the blade 1. Deformation value $\lambda_{min}$ is less than deformation value $\lambda_{max}$. If the value $V_{OUT}$ is less than the minimum threshold value $V_{min}$ the comparator 26 gives out a signal S2 that is sent to the actuator 20. The actuator 20, when the signal S2 is received, gives out a control signal C2 that restarts the motorization 21 of the machine.

Operation of the control system for the cutting blade of a cutting-off machine according to the invention is described hereunder. Before starting the machine, the operator, according to the type of cutting blade, the web material of the logs, and the diameter of the logs, sets the threshold deformation values $\lambda_{max}$ and $\lambda_{min}$. Then the machine is started and the work cycle begins.

After a series of consecutive cuts, the temperature and the deformation of the blade 1 increase. As a result, the deformation value $\lambda_{ril}$ measured by the deformation measuring device 15 can exceed the set maximum threshold deformation value $\lambda_{max}$. In this case the actuator 20 sends the motorization 21 the control signal C1 which stops the general motorization of the machine.

During the resting period of the machine, the rotating blade 1 cools down, also thanks to the intervention of the cooling device 30. As a result the deformation of the blade 1 also decreases with the decreasing temperature. Thus the deformation $\lambda_{ril}$ measured by the deformation measuring device 15, becomes less than the set minimum threshold deformation value $\lambda_{min}$. Consequently the actuator 20 sends the motorization 21 the control signal C2 which restarts the motorization 21 and thus restarts a new work cycle.

Refering to FIG. 4, the blade cooling device 30 is composed of several conduits 31 which distribute air on a portion of the lateral surface of the blade. The conduits shown are tubular elements which represent a plenum for the air, where on the side parallel to the blade, there are a few holes for blowing air on the blade. The conduits are supplied with air by air supply connection elements 32 and are supported on both sides of the blade by supports 33. The conduits can be registered in their position by means of holes and slotted holes drilled on the cooling unit support arm 34 which is integral with the blade holder arm 3. In this way it is possible to distribute air on the blade portion with higher temperature.

Numerous changes or modifications of detail within the reach of a person skilled in the art can be made to the present embodiment of the invention without thereby departing form the scope of the invention as set forth in the appended claims.

We claim:

1. A method of controlling a cutting-off machine for logs of web material, the cutting-off machine having a cutting blade for cutting the logs of web material, the cutting blade being movable by a motorization toward one of the logs to be cut, comprising the steps of:

inputting first and second threshold deformation values of said blade into first and second comparison devices, respectively;

rotating the cutting blade;

using a measuring device to measure a deformation value on at least a portion of the rotating blade and to send a signal indicative of the measured deformation value, said signal being sent to both said first and second comparison devices;

using said first comparison device to compare said measured deformation value with said first threshold deformation value and, when said measured deformation value exceeds said first threshold deformation value, sending a signal from said first comparison device to an actuator, and then sending a first control signal from said actuator to said motorization to stop movement of said blade toward the one log;

using said second comparison device to compare said measured deformation value with said second threshold deformation value and, when said measured deformation value is less than said second threshold deformation value, sending a signal from said second comparison device to said actuator, and sending a second control signal from said actuator to said motorization to start moving said blade toward the one log.

2. A method according to claim 1 in which the step of using said first comparison device to compare said measured deformation value with said first threshold deformation value includes comparing a voltage value corresponding to said signal indicative of the measured deformation value with a maximum threshold voltage value indicative of said first threshold deformation value, and the step of using said second comparison device to compare said measured deformation value with said second threshold deformation value includes comparing a voltage value corresponding to said signal indicative of the measured deformation value with a minimum threshold voltage value indicative of said second threshold deformation value.

3. The method of claim 1 in which said first threshold deformation value is a maximum deformation threshold value, above which the cutting blade could be damaged, and said second threshold deformation value is a minimum threshold deformation value, at which the cutting blade does not risk any damage.

4. The method of claim 1 wherein the measured deformation value is a lateral deformation of said blade.

5. The method of claim 1 in which said cutting blade is mounted for rotation about an axis and including the step of rotating said cutting blade when said motorization is stopped and the cutting blade is not moving toward the one log.

* * * * *